United States Patent

Niccum et al.

(10) Patent No.: US 8,696,995 B2
(45) Date of Patent: Apr. 15, 2014

(54) CYCLONE PLENUM TURBULATOR

(75) Inventors: Phillip K. Niccum, Houston, TX (US); James Eskew, The Woodland, TX (US); Ginger Eskew, legal representative, The Woodland, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 508 days.

(21) Appl. No.: 13/023,845

(22) Filed: Feb. 9, 2011
(Under 37 CFR 1.47)

(65) Prior Publication Data

US 2012/0199518 A1 Aug. 9, 2012

(51) Int. Cl.
*B01J 8/18* (2006.01)
*B01J 8/08* (2006.01)
*B01J 8/00* (2006.01)
*B01J 8/38* (2006.01)
*C10G 75/00* (2006.01)

(52) U.S. Cl.
CPC ........... *B01J 8/0055* (2013.01); *B01J 8/388* (2013.01); *C10G 75/00* (2013.01); *B01J 2208/00707* (2013.01); *B01J 2208/00991* (2013.01); *B01J 2219/00247* (2013.01); *C10G 2300/708* (2013.01); *C10G 2300/807* (2013.01); *C10G 2400/20* (2013.01); *C10G 2300/1081* (2013.01); *C10G 2300/1088* (2013.01)
USPC ............. 422/147; 422/144; 422/214; 55/462; 55/413; 55/414

(58) Field of Classification Search
CPC ............. B01J 8/0055; B01J 8/388; B01J 2208/00991; B01J 2219/00247; C10G 75/00; C10G 2300/708

USPC ............. 422/144, 147, 214; 55/462, 413, 414
See application file for complete search history.

(56) References Cited

U.S. PATENT DOCUMENTS

| | | | |
|---|---|---|---|
| 2,385,745 A | 9/1945 | Vogt | |
| 2,859,168 A * | 11/1958 | Downing et al. | 208/48 R |
| 3,448,563 A | 6/1969 | Sobeck | |
| 4,033,857 A | 7/1977 | Williams et al. | |
| 4,086,064 A | 4/1978 | MacLean et al. | |
| 4,220,623 A | 9/1980 | Jahnke et al. | |
| 4,273,565 A | 6/1981 | Worley | |
| 4,297,203 A | 10/1981 | Ford et al. | |
| 4,325,811 A | 4/1982 | Sorrentino | |
| 4,721,603 A | 1/1988 | Krug et al. | |
| 4,725,410 A * | 2/1988 | Krug et al. | 422/147 |
| 5,215,720 A | 6/1993 | Cetinkaya | |
| 5,242,577 A | 9/1993 | Betts et al. | |
| 5,258,113 A | 11/1993 | Edgerton et al. | |
| 5,266,187 A | 11/1993 | Horecky et al. | |
| 5,370,844 A | 12/1994 | Peterson | |
| 5,453,255 A | 9/1995 | Shaw et al. | |
| 6,406,613 B1 | 6/2002 | Nahas et al. | |

(Continued)

FOREIGN PATENT DOCUMENTS

EP 0613935 9/1994

*Primary Examiner* — Lessanework Seifu
(74) *Attorney, Agent, or Firm* — Gary M. Machetta

(57) ABSTRACT

Methods and apparatus for preventing coke formation in a plenum are provided. The apparatus can include a turbulator for use in a plenum. The turbulator can include a deflector disposed inside the plenum proximate an inlet to the plenum from a cyclone, wherein the plenum and the cyclone are disposed in a fluid catalytic cracker.

20 Claims, 4 Drawing Sheets

(56) References Cited

U.S. PATENT DOCUMENTS

| | | |
|---|---|---|
| 6,866,370 B2 | 3/2005 | Jeanmaire |
| 6,979,360 B1 | 12/2005 | Cetinkaya et al. |
| 7,041,259 B2 | 5/2006 | Cammy et al. |
| 7,799,287 B2 | 9/2010 | Hedrick et al. |
| 8,066,949 B2 * | 11/2011 | McKnight et al. ............ 422/140 |
| 2010/0078305 A1 | 4/2010 | McKnight et al. |

* cited by examiner

CYCLONE PLENUM TURBULATOR

BACKGROUND

1. Field

Embodiments described herein generally relate to reducing the formation of coke. More particularly, such embodiments relate to reducing the formation of coke in a fluid catalytic cracking unit.

2. Description of the Related Art

High residence time combined with high temperature foments coke formation in fluid catalytic cracking product mixtures produced in fluid catalytic cracking ("FCC") units or processes. High residence time (low velocity) pockets of vapor in the FCC units give rise to the coke formation. The coke build up increases the risk that large chunks or pieces of the coke fall into and plug portions of the FCC unit potentially resulting in unit shutdown.

One approach for reducing the formation of coke has involved the introduction of coke suppressive additives to various locations within the FCC unit, e.g. transfer lines, risers, and/or reactor domes. These coke suppressive additives, however, increase operating cost and can have limited effectiveness, depending on the type of hydrocarbon feed introduced to the FCC unit and the particular products produced therein.

There is a continuing need, therefore, for better apparatus, systems, and methods for reducing the formation of coke in an FCC unit.

DETAILED DESCRIPTION

Methods and apparatus for preventing coke formation in a plenum are provided. The apparatus can include a turbulator for use in a plenum. The turbulator can include a deflector disposed inside the plenum proximate an inlet to the plenum from a cyclone, wherein the plenum and the cyclone are disposed in a fluid catalytic cracker.

Figure 1:
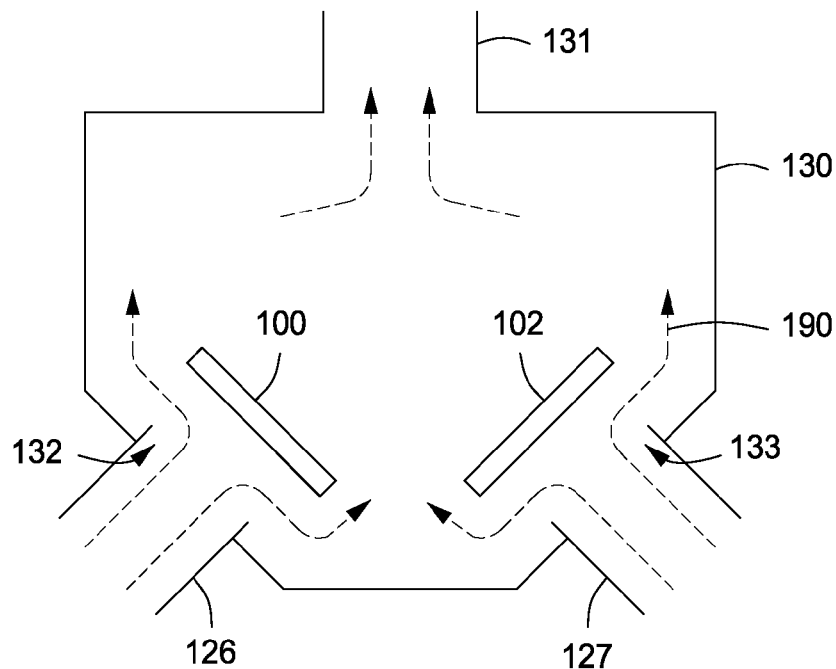
FIG. 1 depicts a schematic of illustrative turbulators disposed proximate inlets to a plenum, according to one or more embodiments described.

FIG. 1 depicts a schematic of illustrative turbulators 100 and 102 disposed proximate inlets (two are shown 132, 133) to a plenum 130, according to one or more embodiments. The inlets 132 and 133 can be configured to receive one or more corresponding cyclone outlet pipes 126 and 127 (one to each inlet 132, 133 is shown), respectively, disposed thereon, therein, therethrough, or otherwise thereabout. The turbulators 100, 102 can be disposed within, proximate to, and/or adjacent the inlets 132, 133.

The turbulators 100, 102 can be any shape, including, but not limited to, flat, boxed, "T"-shaped, domed, angled, convex, concave, or the like. The turbulators 100, 102 can have the same or different shape or design. The turbulators 100, 102 can attach to the plenum 130 and/or the cyclone outlet pipes 126, 127. For example, the turbulators 100, 102 can attach directly to the cyclone outlet pipes 126, 127. In another example, the turbulators 100, 102 can attach to an inner wall or surface of the plenum 130.

In operation, the turbulators 100, 102 can be disposed within the plenum 130 such that one or more flow paths of one or more vapor streams 190 from the cyclone outlet pipes 126, 127 can be changed, modified, or otherwise altered during, upon, and/or after entry into the plenum 130. The turbulators 100, 102 can cause or improve the formation of a turbulent environment within the plenum 130. In other words, the turbulators 100, 102 can minimize low velocity and/or high residence time regions or pockets within the plenum 130. For example, the turbulators 100, 102 can promote one or more turbulent or non-static flow paths of the vapor streams 190 of a fluid and/or fluid/particulate mixture within the plenum 130. Vapor streams 190 from the inlets 132, 133 can exit the plenum 130 through the plenum outlet 131.

Depending, at least in part, on the particular composition of the fluid and/or fluid/particulate mixture introduced via inlets 132, 133, the likelihood or probability of coke forming within the plenum 130 can increase when the residence time of the fluid and/or fluid/particulate mixture is too long. As such, it can be desirable to reduce the occurrence or formation of areas, regions, or volumes within the plenum 130 within which the fluid and/or fluid/particulate mixture slows down and/or stagnates. In other words, reducing low velocity and/or high residence time regions or pockets within the plenum 130 can reduce or prevent the formation of coke within the plenum 130. Diverting the vapor streams 190 with the turbulators 100, 102 can reduce low velocity regions within the plenum 130, as compared to the same plenum 130 without the turbulators 100, 102.

Although illustrated as having the turbulators 100, 102, it will be appreciated that turbulence can be created in the plenum 130 without the turbulators 100, 102. For example, the inlets 132, 133 can be positioned or disposed in sides of the plenum 130 such that the flow paths of the vapor streams 190 from the cyclone outlet pipes 126, 127 can be directed away from the plenum outlet 131 and/or around inner surfaces or sides of the plenum 130, e.g., tangentially along the inner surfaces or sides of the plenum 130. In another example, two or more inlets 132, 133 can be positioned to oppose one another in the plenum 130 to direct the vapor streams 190 toward one another. In yet another example, the plenum 130 and/or the inlets 132, 133 can be shaped or otherwise configured to induce turbulence within the plenum 130, e.g., along the inner surfaces thereof. The particular location of the inlets 132, 133 and/or the particular direction of the flow paths of the vapor streams 190 from the inlets 132, 133 can create sufficient turbulence within the plenum 130 to reduce or prevent formation of coke within the plenum 130 such that the tabulators 100, 102 are not required. For example, the flow paths of the vapor streams 190 and/or the inlets 132, 133 can be directed away from the plenum outlet 131. In another example, the flow paths of the vapor streams 190 and/or the inlets 132, 133 can be directed toward one another and away from the plenum outlet 131. In another example, the flow paths of the vapor streams 190 and/or the inlets 132, 133 can be directed away from one another and away from the plenum outlet 131. In an another example, the cyclone outlet pipes 126, 127 can be in fluid communication with a manifold (not shown) instead of the plenum 130 to provide a combined vapor stream at an outlet thereof.

Figure 2:
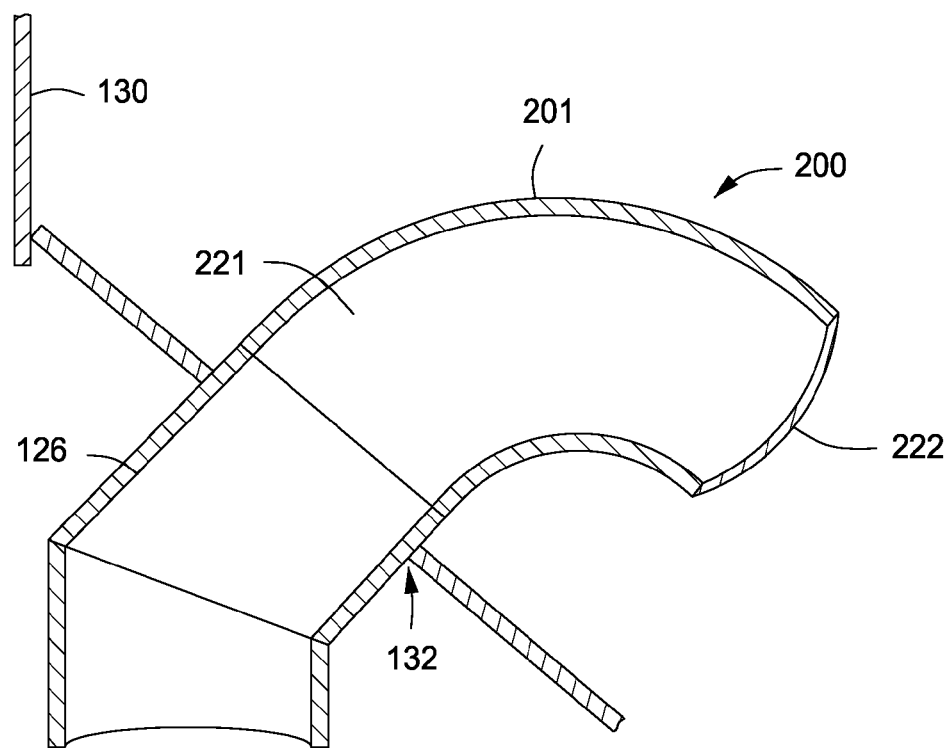
FIG. 2 depicts a cross-sectional view of another illustrative turbulator disposed at an inlet to a plenum, according to one or more embodiments described.

FIG. 2 depicts a cross-sectional view of another illustrative turbulator 200 disposed at an inlet 132 of a plenum 130, according to one or more embodiments. One or more turbulators 200 can be an elbow shaped pipe having a first end or opening 221 and a second end or opening 222. A cyclone outlet pipe 126 can be disposed in or through the inlet 132 of the plenum 130. The first end 221 can be disposed on and/or secured to the cyclone outlet pipe 126. A second end 222 of the turbulator 200 can point in a different direction than the direction of the cyclone outlet pipe 126 as it enters the plenum 130. For example, the second end 222 can point at an angle ranging from a low of about 30°, about 50°, or about 70° to a high of about 120°, about 140°, or about 160°, where the direction of the cyclone outlet pipe 126 has an angle of 0°. In another example, the second end 222 can point at an angle of from about 40° to about 150°, about 60° to about 130°, or about 80° to about 110°. The second end 222 can point away from or can point toward the center of the plenum 130. For example, the second end 22 can point away from the center of the plenum 130 and can be configured to direct vapor streams (not shown) in a direction substantially parallel to a lower floor or lower elevation of the plenum 130.

In operation, the turbulator 200 can direct vapor streams (not shown) coming through the cyclone outlet 126 generally in the direction of the second end 222. Depending on the angle and/or direction of the second end 222, a turbulent environment can be produced in different areas of the plenum 130. Although not shown, a plurality of turbulators 200 can direct vapor streams to a plurality of directions to create a turbulent environment in previously low residence time pockets, i.e. areas within the plenum 130 through which little or no vapor streams flow.

Although not shown, the turbulator 200 can be a "T"-shaped pipe with two outlets pointing in different directions, to further direct vapor streams to more areas of the plenum 130. Also not shown, the turbulator 200 could have multiple pipe-shaped outlets to divert vapor streams in multiple directions within the plenum 130.

Figure 3:
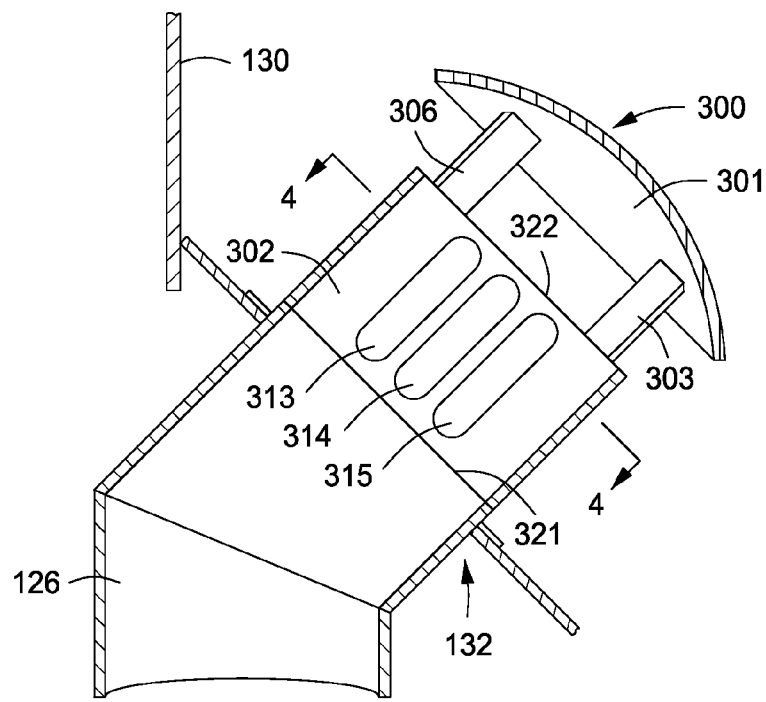
FIG. 3 depicts a cross-sectional view of yet another illustrative turbulator disposed at an inlet to a plenum, according to one or more embodiments described.
Figure 4:
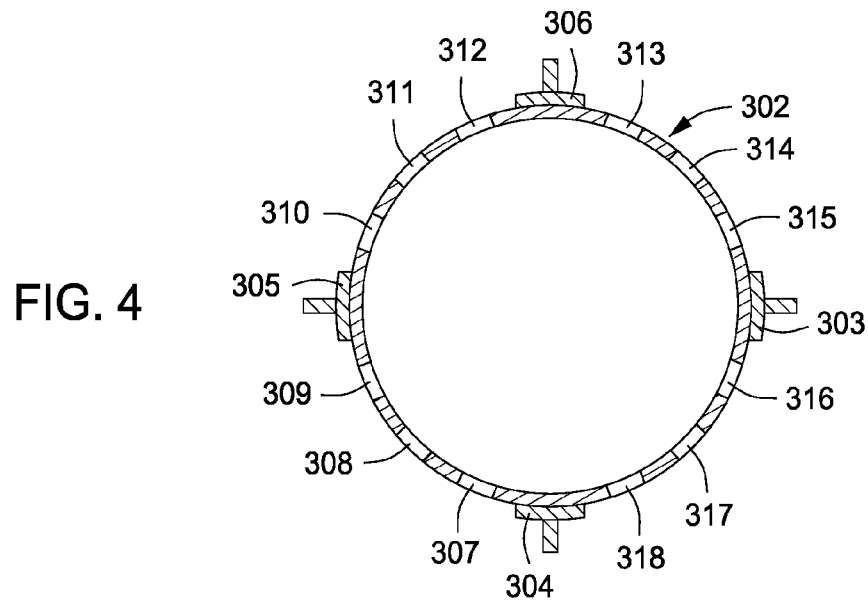
FIG. 4 depicts a cross-sectional view of the turbulator depicted in FIG. 3 along line 4-4.

FIG. 3 depicts a cross-sectional view of yet another illustrative turbulator 300 disposed at an inlet 132 of a plenum 130, according to one or more embodiments. The turbulator 300 can have a deflector 301, a tubular base 302, and one or more connectors (two are shown 303, 306).

The tubular base 302 can have a first end 321 and a second end 322. The first end 321 can be disposed on or attached to a cyclone outlet pipe 126 that is disposed in or through the inlet 132 of the plenum 130. The inlet 132 can be an opening formed through a sidewall or bottom wall of the plenum 130.

The tubular base 302 can have one or more holes or vents (three are shown 313, 314, 315) disposed therethrough. The vents 313, 314, 315 can be disposed in the sidewall of the tubular base 302. The vents 313, 314, 315 can be small or large, thick or thin, short or tall, or any combination thereof. The vents 313, 314, 315 can be any shape, including, but not limited to, circular, elliptical, rectangular, square, triangular, other polygonal shape, or any combination thereof. For example, the vents 313, 314, 315 can have two curved sides and two straight sides as shown. The vents 313, 314, 315 can be axially oriented, circumferentially oriented, or in some other orientation.

The connectors 303, 306 can join or secure the tubular base 302 to the deflector 301. For example, the connectors 303, 306 can be fastened to the tubular base 302 proximate the second end 322 and can be fastened to the deflector 301. The connectors 303, 306 can support the weight of the deflector 301. The connectors 303, 306 can create space between the base 302 and the deflector 301 for at least partially unimpeded dispersion of vapor streams from the deflector 301. The connectors 303, 306 can be joined to the outside of the tubular base 302, as shown, and/or inside of the tubular base 302 (not shown).

The deflector 301 can have a variety of shapes and sizes. For example, the deflector 301 can be flat, concave, or convex with respect to the inlet 132 to the plenum 130. The deflector 301 also can be box shaped (not shown) or domed. As shown, the convex shape of the deflector 301 can increased the strength of the deflector 301 and can aid broad dispersion of the vapor streams (not shown) throughout the plenum 130.

In operation, the turbulator 300 can divert flow of the vapor streams (not shown) from the cyclone outlet pipe 126 to create a turbulent environment in the plenum 130. The turbulent environment created by the turbulator 300 can limit or prevent coke formation within the plenum 130. For example, the deflector 301 of the turbulator 300 can divert a vapor stream in a plurality of directions. When the deflector 301 is convex, as shown, the vapor streams can be diverted at a variety of angles, including toward the sidewalls, the bottom, and/or a top of the plenum 130. The turbulator 300 can divert a vapor stream at least partially between the deflector 301, the tubular base 302, and/or through the vents 313, 314, 315 in the sidewall of the tubular base 302. As the vapor streams are diverted by the deflector 301, a turbulent environment can be created in all or most of the plenum 130. The resulting turbulent environment can minimize high residence time vapor pockets and thereby minimize coke formation and deposits within the plenum 130.

FIG. 4 depicts a cross-sectional view of the turbulator depicted in FIG. 3 along line 4-4. As shown the turbulator 300 can have a circular cross-section, corresponding to the circular cross-section of the cyclone outlet pipe 126. The shape of the turbulator 300, however, does not have to be circular and can correspond or not correspond with the shape of the cyclone outlet pipe 126. For example, although not shown, if the cyclone outlet pipe 126 has a square cross section (not shown), the turbulator 300 can have similar square shaped cross-section. The tubular base 302 can have the same diameter or cross-sectional area or a different diameter or cross-sectional area as the cyclone outlet pipe 126.

The turbulator 300 can have a plurality of vents (twelve are shown 307-318) disposed in the sidewall of the tubular base 302. The vents 307-318 can be configured to stir up vapor streams (not shown) at a bottom or lower end of the plenum 130 while making it difficult for any coke that might form in the plenum 130 from rolling from the plenum 130 into a cyclone outlet pipe 126 and plugging a lower portion of the cyclone, e.g., a cyclone dipleg. The one or more connectors (four are shown 303, 304, 305, 306) can be spaced around the base 302 of the turbulator 300. For example, the connectors 303, 304, 305, 306 can be equally spaced around the base 302, as shown. Although not shown, the connectors 303, 304, 305, 306 can be unequally spaced around the base 302. In another example, four connectors 303, 304, 305, 306 can be disposed about the first end 321 of the tubular base 302 and three or more of the plurality of vents 307-318 can be disposed between each connector 303, 304, 305, 306. The connectors 303, 304, 305, 306 can be "T"-shaped or any shape to provide support for the deflector 301.

Figure 5:
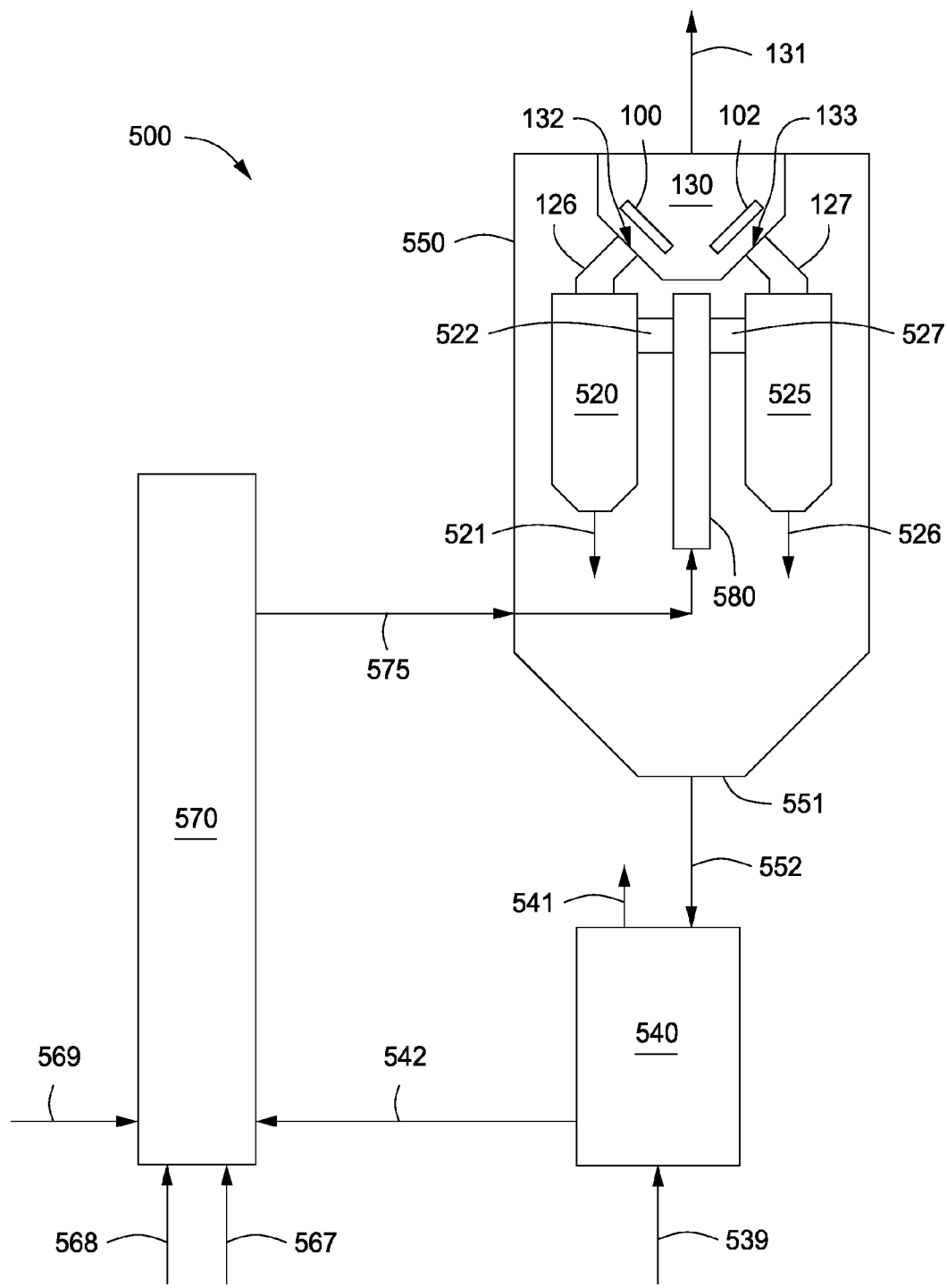
FIG. 5 depicts a schematic of an illustrative fluid catalytic cracking unit, according to one or more embodiments described.

FIG. 5 depicts a schematic of an illustrative fluid catalytic cracking unit 500, according to one or more embodiments. The fluid catalytic cracking ("FCC") unit 500 can include one or more reaction risers or risers 570, ducts or transition lines 575, separation zones 550, and regenerators 540. Although not shown, the regenerator 540 can include a dense phase catalyst zone, a dilute phase catalyst zone, one or more distributors, one or more fluid introduction nozzles, and one or more cyclones. All or any portion of inner surfaces of the one or more reaction risers 570, transition lines 575, and/or regenerators 540 can be metal and free of non-metal coatings or linings, for example, linings of ceramic or refractory material. Alternatively, all or any portion of inner surfaces of the one or more reaction risers 570, transition lines 575, and/or regenerators 540 can have a lining of ceramic or refractory material.

Steam via line 568, one or more hydrocarbons via line 569, one or more coke precursors via line 567, and one or more catalysts via line 542 can be introduced to the riser 570, forming a fluidized mixture ("reaction mixture") therein. The steam via line 568, the hydrocarbon via line 569, the coke precursor via line 567, and the catalyst via line 542 can be introduced separately to the reaction riser 570. Alternatively, the steam via line 568, the hydrocarbon via line 569, the coke precursor via line 567, and the catalyst via line 542 can be mixed and introduced together as a mixture to the riser 570.

The hydrocarbon introduced via line 569 can be a light hydrocarbon, where the light hydrocarbon produces insufficient coke for heat balanced operation. The coke precursor via line 567 can be present to supply sufficient coke to facilitate heat-balancing within the process or at least to reduce the amount of supplemental fuel required for heat balancing. If a heavy feedstock is used as a coke precursor, some heavy oil can be produced to aid in fines recovery. Although not shown, the coke precursor via line 569 can be introduced directly to the regenerator 540 as a supplemental fuel. For example, the coke precursor via line 569 can be introduced to the dense phase catalyst zone, the dilute phase catalyst zone, or a combination thereof.

The coke precursor introduced via line 567 can be or include any hydrocarbon or other carbon containing material that can form coke, which can deposit on the catalyst particles to produce coked or spent catalyst particles. The coke precursor introduced via line 567 can be a heavy feedstock such as a refinery stream boiling in a temperature range of from about 650° C. to about 750° C. Alternatively, the coke precursor introduced via line 567 can be a refinery stream boiling in a range from about 220° C. to about 645° C. A hydrocarbon fraction boiling at a temperature ranging from about 285° C. to about 645° C. can be referred to as a gas oil boiling range component, while a hydrocarbon fraction boiling at a temperature ranging from about 220° C. to about 645° C. can be referred to as a full range, gas oil/resid fraction or a long resid fraction.

Hydrocarbon fractions boiling at a temperature of greater than about 535° C. can be regarded as residual fractions. Such residual fractions can include higher proportions of components that tend to form coke in the FCC unit 500. Gas oil and long resid fractions can be derived from several refinery process sources including but not limited to a low, medium, or high sulfur crude unit atmospheric and/or vacuum distillation tower, a delayed or fluidized coking process, a catalytic hydrocracking process, and/or a distillate, gas oil, or resid hydrotreating process. Coke precursors introduced via line 567 can be derived as by-products from lubricating oil manufacturing facilities including, but not limited to, a lubricating oil viscosity fractionation unit, solvent extraction processes, solvent dewaxing processes, or hydrotreating processes.

The hydrocarbon feed introduced via line 569 can include, but is not limited to, olefins, paraffins, naphthas, mixtures thereof, or any combination thereof. The hydrocarbon feed introduced via line 569 can originate from a refinery. For example, the hydrocarbon feed introduced via line 569 can be a gas mixture resulting from the distillation of crude oil.

The hydrocarbon feed introduced via line 569 can be or include hydrocarbon compounds containing about 60 carbon atoms or less, about 40 carbon atoms or less, about 20 carbon atoms or less, about 12 carbon atoms or less, about 10 carbon atoms or less, about 8 carbon atoms or less, or about 6 carbon atoms or less. The hydrocarbon feed introduced via line 569 can be or include hydrocarbon compounds containing from about 1 to about 16 carbon atoms, about 2 to about 12 carbon atoms, or about 4 to about 8 carbon atoms. For example, the hydrocarbon feed introduced via line 569 can include $C_1$ to $C_{12}$ hydrocarbons, $C_1$ to $C_{10}$ hydrocarbons, $C_1$ to $C_8$ hydrocarbons, $C_1$ to $C_6$ hydrocarbons, $C_1$ to $C_4$ hydrocarbons, $C_1$ to $C_4$ hydrocarbons, $C_2$ to $C_6$ hydrocarbons, $C_1$ to $C_8$ hydrocarbons, $C_2$ to $C_{10}$ hydrocarbons, or $C_1$ to $C_{12}$ hydrocarbons. In another example, the hydrocarbon feed introduced via line 569 can include from about 0.1 percent by volume ("vol %") to 5 vol % methane, from about 0.1 vol % to about 80 vol % ethane, and from about 0.1 vol % to about 80 vol % propane. The hydrocarbon feed introduced via line 569 can contain from about 0 vol % to about 35 vol % butane and from about 0 vol % to about 20 vol % pentane and heavier hydrocarbons. The hydrocarbon feed introduced via line 569 can include about 60 wt % or more $C_2$-$C_{11}$ olefins and paraffins.

The hydrocarbon feed introduced via line 569 can be pre-heated prior to introduction to the riser 570. Although not shown, a regenerative heat exchanger using waste process heat can be used to pre-heat the hydrocarbon feed introduced via line 569. The temperature of the hydrocarbon feed via line 330 can range from about 100° C. to about 500° C., about 150° C. to about 400° C., or about 200° C. to about 500° C. The pressure of the hydrocarbon feed via line 330 can range from about 10 kPa to about 1,000 kPa, about 30 kPa to about 500 kPa, or about 100 kPa to about 350 kPa.

The hydrocarbon feed introduced via line 569 can be partially or completely vaporized prior to introduction to the riser 570. The amount of the hydrocarbon feed introduced via line 569 that can be vaporized can range from a low of about 10 vol %, about 20 vol %, about 30 vol %, or about 40 vol % to a high of about 70 vol %, about 80 vol %, about 90 vol %, or about 100 vol %. For example, the hydrocarbon feed introduced via line 569 can be about 80 wt % or more vaporized, about 85 wt % or more vaporized, about 90 wt % or more vaporized, about 95 wt % or more vaporized, or about 99 wt % or more vaporized prior to introduction to the reaction riser 570. Within the riser 570, the pressure and temperature can be adjusted either manually or automatically to compensate for variations in the composition of the hydrocarbon feed introduced via line 569 and to maximize the yield of preferred hydrocarbons obtained in the first product recovered via line 131 by cracking the hydrocarbon feed introduced via line 569 in the presence of the one or more catalysts.

The steam introduced via line 568 to the riser 570 can be saturated. The pressure of the saturated, steam introduced via line 568 can be from about 100 kPa to about 2,000 kPa, about 500 kPa to about 5,000 kPa, or about 1,000 kPa to about 6,000 kPa. For example, the pressure of the saturated steam introduced via line 568 can range from about 100 kPa to about 8,300 kPa, about 100 kPa to about 4,000 kPa, or about 100 kPa to about 2,000 kPa.

The steam introduced via line 568 to the riser 570 can be superheated. The pressure of the superheated steam introduced via line 568 can be from a low of about 100 kPa to a high of about 8,500 kPa. The pressure of the superheated steam introduced via line 568 can range from about 100 kPa to about 8,300 kPa, about 100 kPa to about 4,000 kPa, or about 100 kPa to about 2,000 kPa. The temperature of the superheated steam introduced via line 568 can be about 200° C. or more, about 230° C. or more, about 260° C. or more, or about 290° C. or more.

The steam can be introduced via line 568 to the riser 570 at a rate proportionate to the hydrocarbon feed rate introduced via line 569. The steam-to-hydrocarbon weight ratio can range from about 1:20 to about 50:1, from about 1:20 to about 20:1, or from about 1:10 to about 20:1. The steam-to-hydrocarbon weight ratio can remain constant or can vary.

Heat in the riser 570, provided by the steam via line 568 and the catalyst via line 542, can vaporize the hydrocarbon feed introduced via line 569 to provide the reaction mixture therein. Supplemental heat can be provided to the risers 570 using waste heat provided from the regenerator 540. Within the riser 570, the hydrocarbons within the reaction mixture can be cracked into one or more hydrocarbons and hydrocarbon by-products to provide a first product mixture via the transition line 575. At least a portion of the hydrocarbon by-products present in the riser 570 can deposit on the surface of the catalyst particulates, forming coked-catalyst particulates or spent catalyst. Thus, the first product mixture exiting the riser 570 can contain coked-catalyst particulates suspended in gaseous hydrocarbons, hydrocarbon by-products, carbon dust or particulates, steam, and other inerts. As such, the first product mixture in the transition line 575 can be a reduced environment of gaseous hydrocarbons.

The amount of coke or carbon deposited on the catalyst particulates can range from a low of about 0.01 percent by weight ("wt %"), about 0.1 wt %, about 0.5 wt %, or about 1.0 wt % to a high of about 2 wt %, about 3 wt %, about 4 wt %, or about 5 wt %. For example, the amount of coke deposited on the catalyst particulates can range from about 0.5 wt % to about 4.5 wt %, from about 0.7 wt % to about 3.5 wt %, or from about 0.9 wt % to about 1.1 wt % based on the total weight of the carbon deposits and the catalyst particulates. The amount of coke deposited on the catalyst particulates can be about 1 wt %.

The catalyst-to-hydrocarbon weight ratio can range from about 2:1 to about 40:1, from about 3:1 to about 30:1, or from about 4:1 to about 20:1. The riser 570 can be operated at a temperature ranging from a low of about 425° C., about 450° C., about 475° C., or about 500° C. to a high of about 635° C., about 675° C., about 700° C., or about 825° C. For example, the riser 570 can be operated at a temperature ranging from about 400° C. to about 675° C., from about 605° C. to about 670° C., from about 610° C. to about 660° C., or from about 615° C. to about 650° C. In at least one specific embodiment, the riser 570 can be operated at a temperature of about 605° C., about 615° C., about 625° C., about 630° C., about 640° C., or about 650° C.

The pressure in the riser 570 can range from, but is not limited to, a low of about 40 kPa, about 55 kPa, about 65 kPa, or about 70 kPa to a high of about 650 kPa, about 675 kPa, about 700 kPa, or about 725 kPa. Cracking can occur in the riser 570 at a temperature of from about 590° C. to about 675° C. and at a pressure of from about 68 kPa to about 690 kPa.

The velocity of the reaction mixture flowing through the riser 570 can range from about 3 m/sec to about 27 m/sec, about 6 m/sec to about 25 m/sec, or about 9 in/sec to about 21 m/sec. The residence time of the reaction mixture in the riser 570 can be less than about 20 seconds, less than about 10 seconds, less than about 8 seconds, less than about 4 seconds, or less than about 2 seconds.

Although not shown, two or more risers 570 can be operated together, for example in parallel. Such an arrangement can provide an FCC unit 500 that can crack two different types of hydrocarbon feeds. For example, a first riser 570 can crack a "light" hydrocarbon feed, such as $C_3$ and $C_4$ hydrocarbons, and a second riser 570 can crack a "heavy" hydrocarbon feed, such as $C_{10}$ to $C_{20}$ hydrocarbons. The products produced from two or more risers 570 can be introduced to the same or different separation zone(s) 550. The coked catalyst particles produced from the two or more risers 570 can be regenerated in one or more regenerators 540. For example, the coked catalyst particles from the two or more risers 570 can be combined and regenerated together within a single regenerator 540. Such a combination of multiple risers and feeds can reduce or eliminate the need for introducing a coke precursor via line 567. For example, a heavy hydrocarbon introduced to a first riser 570 can deposit sufficient coke on the catalyst particles that will generate enough heat within the regenerator 540 to regenerate coked catalyst particles produced from a second riser 570 that cracked a light hydrocarbon. For example, a first riser 570 can provide coked catalyst particles having about 0.1 wt % carbon deposited thereon and a second riser 570 can provide coked catalyst particles having about 1.1 wt % deposited thereon. The amount of carbon provided by combining these two coked catalyst particles within a single regenerator 540 can provide sufficient heat to regenerate the coked catalyst particles. Regeneration of the coked catalyst particles having about 0.1 wt % can require the coke precursor via line 567. The combination of the two coked catalyst particle feeds can reduce the amount of coke precursor required via line 567.

The first product mixture can flow, via the transition line 575, to the separation unit 550 where the coked-catalyst particulates and/or other particulates can be separated from the gaseous hydrocarbons, steam, and inerts. The separation unit 550 can include one or more first or "central" plenums 580, one or more separators 520, 525, and one or more second or "upper" plenums 130.

The separators 520, 525 can include one or more inlets (two are shown 522, 527), one or more outlet pipes (two are shown 126, 127), and one or more diplegs (two are shown 521, 526). The inlets 522, 527 can be tangential inlets and can allow fluid communication between the first plenum 580 and the separators 520, 525.

The separators 520, 525 can have a larger cross-sectional area than the riser 570 and/or the transition line 575, which can reduce the velocity of the first product mixture, allowing the heavier coked-catalyst particulates and/or other particulates to separate from the gaseous hydrocarbons, steam, and inerts. A steam purge (not shown) can be added to the separators 520, 525 to assist in separating the gaseous hydrocarbons from the coked-catalyst particulates, i.e. stripping the gaseous hydrocarbons from the solids. In other words, the separators 520, 525 can be self-stripping separators. The separators 520, 525 can be cyclones, e.g. self-stripping cyclones, known in the art.

The plenums 580, 130 can be sealed vapor outlet plenums. The outlet pipes 126, 127 of the separators 520, 525 can be disposed on or through one or more inlets 132, 133 into the second plenum 130. One or more turbulators 100, 102 can be disposed at the inlets 132, 133 of the second plenum 130. Although not shown, the turbulator 200 depicted in FIG. 2 and/or the turbulator 300 depicted in FIG. 3 can be used in place of either of the turbulators 100, 102.

The transition line 575 can introduce the first product mixture from the riser 570 to the first plenum 580. The product mixture via the transition line 575 can be a hydrocarbon vapor suspension. The vapor suspension can flow from the first plenum 580 into the separators 520, 525 via the inlets 522, 527 to produce a solids-lean vapor stream via the outlet pipes 126, 127 and a particulate-rich stream via the diplegs 521, 526. For example, the separators 520, 525 can separate catalyst solids or particulates from the product mixture to form a vapor vortex of reduced solids content or a solids-lean vapor that can feed into the second plenum 130. Disentrained particulates can rapidly concentrate at the walls of the separators 520, 525, pass downward, and can then be discharged through the diplegs 521, 526 into a catalyst bed (not shown). Although not shown, separators or cyclones can be disposed before the first plenum 580 and separate catalyst solids or particulates from the product mixture prior to its introduction to the first plenum 580.

The turbulators 100, 102 can divert flow of the solids-lean vapor from the cyclone outlet pipes 126, 127 to create a turbulent environment in the plenum 130. The turbulent environment created by the turbulators 100, 102 can limit or prevent coke formation within the plenum 130. Vapor from the inlets 132, 133 can exit the plenum 130 through the plenum outlet 131.

The turbulators 100, 102 can also limit or discourage large chunks of coke from falling into the separators 520, 525 where the chunks could fall and plug the diplegs 521, 526 and could potentially shut down the FCC unit 500. For example, the turbulators 100, 102 can raise the outlet via the outlet pipes 126, 127 from the floor or sidewalls of the plenum 130, to limit coked chunks formed on the floor or sidewalls of the plenum 130 from falling through or drifting into the outlet pipe 126, 127 of the cyclones 520, 525.

The gaseous hydrocarbons ("first product") via line 131 can be recovered from the separation unit 550. Although not shown, the first product in line 131 can be further processed, such as by dehydrating or fractionating to produce one or more finished products including, but not limited to, one or more olefins, paraffins, aromatics, mixtures thereof, derivatives thereof, and/or combinations thereof. For example, the first product via line 131 can be introduced to a quench tower that can quench the first product and separate entrained catalyst particulates therefrom. Entrained catalyst particulates separated from the first product can be recycled back to the riser 570 and/or to the regenerator 540. In one or more embodiments, a suitable FCC system known in the art, having a quench tower for quenching and separating entrained catalyst particulates from the first product 131, can be used.

The separation unit 550 can separate about 99%, about 99.5%, about 99.9%, about 99.99%, or about 99.999% of the particulates from the first product mixture via the transition line 575. For example, the separation unit 550 can separate about 99.9% to about 99.997%, about 99.95% to about 99.996%, or about 99.95% to about 99.99% of the particulates from the first product mixture via the transition line 575.

The coked-catalyst particulates and/or other particulates can free fall through the particulate outlet 551 of the separation unit 550 and can be introduced via line 552 to the regenerator 540. The coked-catalyst particulates introduced via line 552 can be combined with a fluid introduced via line 539 within the regenerator 540 to provide a flue gas via line 541 and regenerated catalyst via line 542.

The fluid introduced via line 539 can include one or more oxidants and/or supplemental fuel. Illustrative oxidants can include, but are not limited to, air, oxygen, mixtures of air or oxygen and other gases such as nitrogen, and/or oxygen enriched air. The supplemental fuel can include any combustible material. For example, the supplemental fuel can include, but is not limited to, $C_1$ to $C_{20}$ hydrocarbons and/or carbon. The supplemental fuel can be introduced as a liquid, gas, solid, or any combination thereof to the regenerator 540.

The one or more oxidants can react with the carbonaceous matter on the coked-catalyst particulates to combust or otherwise burn the carbon ("coke") off the surface of the catalyst particulate. Should supplemental fuel be introduced, the one or more oxidants can react with the supplemental fuel to combust the supplemental fuel and generate heat. The removal of the coke from the surface of the catalyst particulate can re-expose the reactive surfaces of the catalyst particulates, thereby "regenerating" the catalyst particulate and permitting reuse thereof. Combustion by-products, such as carbon monoxide, nitrogen oxides, nitrogen oxide precursors, and carbon dioxide, can be removed from the regenerator 540 as the waste or flue gas via line 541. The regenerated catalyst particulates can be recovered via line 542 and recycled to the riser 570. Fresh, unused, catalyst can be added (not shown) to the regenerator 540, the regenerated catalyst in line 542, and/or to the riser 570.

The regenerator 540 can be operated in full burn mode, partial burn mode, or anywhere in between. Operating the regenerator 540 in a full burn mode can provide an exhaust gas or flue gas via line 542 that can contain a larger amount of nitrogen oxides ("NOx") and a decreased amount of carbon monoxide (CO) and NOx precursors relative to the partial burn mode. Operating the regenerator 540 in a partial burn mode can provide an exhaust gas or flue gas via line 542 that can contain a larger amount of CO and NOx precursors and a lesser amount of NOx relative to the full burn mode. Operating the regenerator 540 in between the two extremes of full burn and partial burn can provide an exhaust gas via line 542 that contains less NOx and NOx precursors and more CO when compared to the full burn mode. The NOx gases can include, but are not limited to, NO, $NO_2$, and $N_2O$. In another example, the NOx precursors can include, but are not limited to, HCN, $NH_3$, CN, and HNO.

The flue gas via line 542 can be introduced to one or more optional CO boilers (not shown) to remove additional CO. The one or more CO boilers can be any type of CO boiler. The CO boiler can be operated in multiple stages to reduce the flame temperature occurring in any one stage and limit NOx formation in an oxidizing atmosphere. Low NOx burners can also be used to burn a fuel gas (not shown) to keep the CO boiler lit. Ammonia or an ammonia precursor, such as urea, can be introduced (not shown) to the optional CO boiler to reduce NOx emissions even further. These materials can react quickly with NOx and NOx precursors to reduce it to nitrogen. Additional details for conventional FCC processes and flue gas treatment are known in the art. FCC processes for converting lighter hydrocarbon feeds, such as $C_3$ and $C_4$ hydrocarbons are also known in the art.

At least a portion of the flue gas via line 542 and/or flue gas from the optional CO boiler can be vented to the atmosphere and/or sent to one or more heat recovery units (not shown) and then vented to the atmosphere, sequestered underground, or otherwise disposed. The optional CO boiler, if used, can reduce the CO content of the flue gas via line 542 by from a low of about 5%, about 30%, about 50%, about 90% to a high of about 99%, about 99.9%, about 99.95%, or about 99.99%.

Although not shown, a carbon dioxide ($CO_2$) separation unit can be used to remove at least a portion of the $CO_2$ from the flue gas via line 542. $CO_2$ can be removed for sequestration or reuse, e.g., reuse through enhanced oil recovery.

The one or more optional heat recovery units (not shown) can include any device, system, or combination of systems and/or devices suitable for transferring heat from a fluid at a higher temperature to a fluid at a lower temperature. For example, the heat recovery unit can include, but is not limited to single or multiple pass heat exchange devices, such as shell and tube heat exchangers, plate and frame heat exchangers, spiral heat exchangers, bayonet type heat exchangers, U-tube heat exchangers, and/or any similar system or device.

A fluidized mixture containing spent catalyst particulates, regenerated catalyst particulates, oxidants, carbon monoxide, carbon dioxide, nitrogen oxides, and/or the fluid introduced via line 539 can be combined within the regenerator 540 with one or more optional doping agents introduced thereto. The dispersal and deposition of the doping agents on the regenerated catalyst can be enhanced by the high temperature and fluid velocity present in the regenerator 540. Although not shown, the optional doping agents can be mixed with a supplemental fuel, for example natural gas, and introduced to the regenerator 540. The use of supplemental fuel can provide additional heat within the regenerator 540, further enhancing the regeneration of the coked-catalyst particulates therein.

The selection of an appropriate doping agent or additive or blend of two or more doping agents or additives can be based, at least in part, upon the composition of the incoming hydrocarbon feed via line 569, and/or desired gaseous hydrocarbons to be produced in the first product via line 131. For example, the addition of a class 2 doping agent such as magnesium or barium can preferentially increase the production of ethylene in the first product recovered via line 131. In another example, the addition of a class 13 doping agent, such as gallium, can result in increased production of aromatic hydrocarbons in the first product recovered via line 131. In yet another example, the addition of class 8, 9, or 10 doping agents such as ruthenium, rhodium, or palladium can preferentially increase the production of propylene in the first product recovered via line 131.

The first product via line 131 can include from about 5 wt % to about 30 wt % $C_2$; about 5 wt % to about 60 wt % $C_3$; about 5 wt % to about 40 wt % $C_4$; about 5 wt % to about 50 wt % $C_5$, and heavier hydrocarbons. The temperature of the first product in line 131 can range from a low of about 425° C., about 450° C., about 475° C., or about 500° C. to a high of about 635° C., about 675° C., about 700° C., or about 825° C. For example, the temperature of the first product in line 131 can be from about 400° C. to about 675° C., from about 605° C. to about 670° C., from about 610° C. to about 660° C., or from about 615° C. to about 650° C.

Doped catalyst particulates and/or regenerated catalyst particulates with or without one or more doping agents or additives can be recycled to the riser 570 via line 542. The flow of regenerated catalyst particulates from the regenerator 540 can be controlled using one or more valves (not shown), which can be manually or automatically adjusted or controlled based upon parameters derived from process temperatures, pressures, flows, and/or other process conditions. About 90 wt % or more, about 95 wt % or more, about 99 wt % or more, or about 99.99 wt % or more of the regenerated catalyst particulates, makeup catalyst particulates, and/or doped catalyst particulates introduced via line 542 to the riser 570 can be regenerated, optionally doped with one or more doping agents, and recycled via line 542 back to the reaction riser 570.

Prophetic Examples

Embodiments of the present invention can be further described with the following prophetic examples. Although the simulated examples are directed to specific embodiments, they are not to be viewed as limiting the invention in any specific respect.

Figure 6:
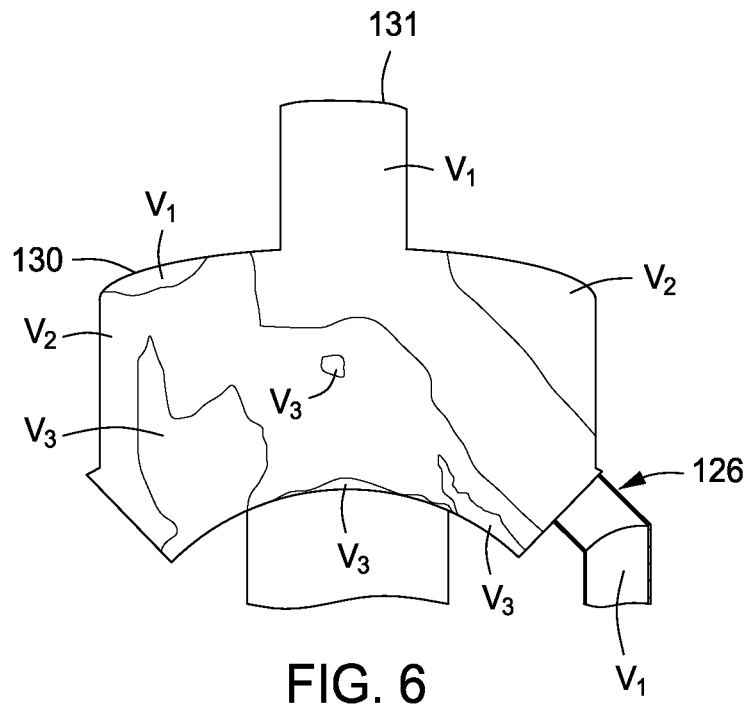
FIG. 6 depicts the simulated velocity contour of an elevational, cross-sectional view of an illustrative plenum without a turbulator, according to one or more embodiments described.
Figure 7:
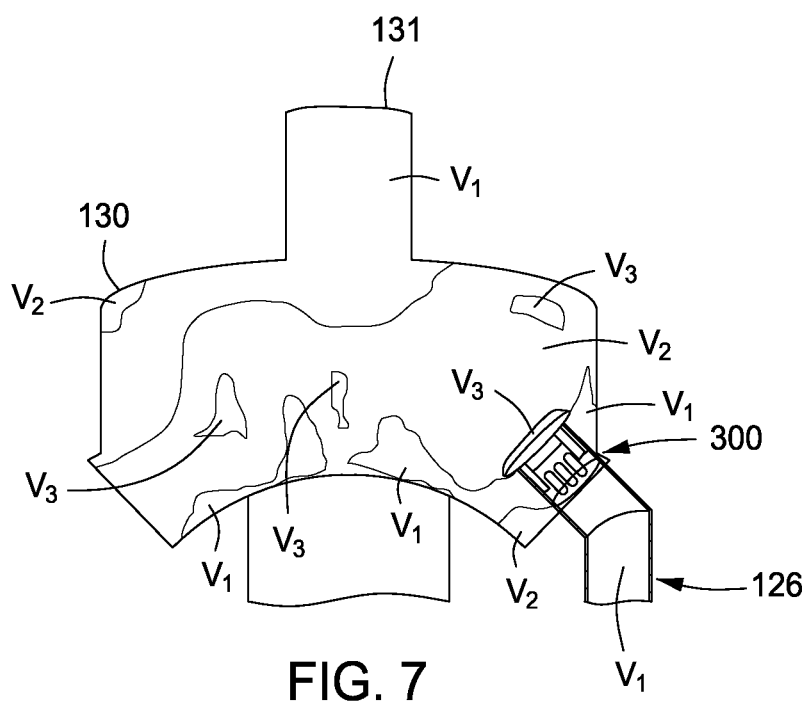
FIG. 7 depicts the simulated velocity contour of an elevational, cross-sectional view of an illustrative plenum with an exemplary turbulator disposed therein, according to one or more embodiments described.

FIGS. 6-7 are derived from Computational Fluid Dynamics ("CFD") simulations. CFD simulations are widely used to simulate gas and/or liquid flow fields, and were used to model the flow of vapor from a separation cyclone of a fluid catalytic cracker and through a plenum connected to the outlet of that cyclone. A summary of the CFD results is shown in FIGS. 6 and 7 and Table 1 below.

To generate the results depicted in FIGS. 6-7 and Table 1, the gas flow rate was set at 270,250 lb/hr, the temperature was set at 1175° F., the pressure was set at 20.1 psig, the gas density was set at 0.072 lb/ft$^3$, the gas viscosity was set at 0.0232 cP, the gas specific heat was set at 0.777 BTU/lb-F, and the gas thermal conductivity was set at 0.0644 BTU/h-ft$^2$-F. The simulation ignores catalyst particles due to their very low concentration in the gas.

FIG. 6 depicts the simulated velocity contour of an elevational, cross-sectional view of an illustrative plenum 130 without a turbulator, according to one or more embodiments. FIG. 7 depicts the simulated velocity contour of an elevational, cross-sectional view of an illustrative plenum 130 with an exemplary turbulator 300 disposed therein, according to one or more embodiments.

Some of the velocities for the simulated velocity contours for the plenum 130 without the turbulator 300 depicted in FIG. 6 and the plenum 130 with the turbulator 300 depicted in FIG. 7 are shown in Table 1 below. The velocities $V_1$-$V_3$ shown in Table 1 are in ft/s and are approximate.

TABLE 1

|  | Plenum 130 without the turbulator 300 | Plenum 130 with the turbulator 300 |
| --- | --- | --- |
| $V_1$ | ≥22.3 ft/s | ≥22.8 ft/s |
| $V_2$ | 7.4-22.3 ft/s | 7.6-22.8 ft/s |
| $V_3$ | ≤7.4 ft/s | ≤7.6 ft/s |

Table 1, with FIGS. 6 and 7, illustrates that a turbulator 300 disposed in the plenum 130 proximate a cyclone outlet 126 changed the velocity patterns within the plenum 130. In the base configuration (ie without turbulator) depicted in FIG. 6, a high velocity jet or stream took vapor from the cyclone outlet 126 almost directly through the plenum 130 to the plenum outlet 131, as evidenced by the higher velocity area ($V_1$) in the path from the cyclone outlet 126 to the plenum outlet 131 and the lower velocity areas ($V_2$ and $V_3$) elsewhere, particularly near the floor of the plenum 130.

In the configuration having the turbulator 300 disposed near the cyclone outlet 126 from the cyclone depicted in FIG. 7, the lowest velocity areas ($V_3$) within the plenum 130 were greatly diminished and jetting from the outlet 126 to the plenum outlet 131 was reduced. Specifically, increases in velocity occurred near the floor of the plenum 130. The increases in velocity within the plenum 130 minimized high residence time within areas of the plenum 130, thereby reducing coke formation therein.

Embodiments of the present disclosure further relate to any one or more of the following numbered paragraphs 1 through 20:

1. A turbulator for use in a plenum, comprising a deflector disposed inside a plenum proximate an inlet to the plenum from a cyclone, wherein the plenum and the cyclone are disposed in a fluid catalytic cracker.

2. The turbulator of paragraph 1, wherein the deflector is in the shape of a flat plate.

3. The turbulator of paragraph 1 or 2, wherein the deflector is an elbow shaped pipe.

4. The turbulator according to any one of paragraphs 1 to 3, wherein the deflector is concave with respect to the inlet.

5. The turbulator of paragraph 4, further comprising a tubular having a first end and a second end, wherein one or more vents are formed through sidewalls of the tubular, and wherein the first end of the tubular is disposed proximate the inlet to the plenum; and one or more connectors disposed between the deflector and the second end of the tubular.

6. The turbulator of paragraph 5, wherein the first end of the tubular is fixed to a wall of the plenum, and wherein an opening at the first end corresponds in size and shape to the inlet in the plenum.

7. A system for turbulating a plenum, comprising a plenum having an opening in a wall thereof; a separator having an outlet pipe disposed thereon, wherein the outlet pipe is disposed at the opening in the wall of the plenum; and a turbulator disposed inside the plenum proximate the opening in the wall of the plenum, the turbulator comprising a deflector.

8. The system of paragraph 7, wherein the separator is a cyclone.

9. The system of paragraph 7 or 8, wherein the outlet pipe is disposed through the opening in the wall of the plenum.

10. The system according to any one of paragraphs 7 to 9, wherein the turbulator further comprises a tubular base having a first end and a second end, wherein one or more holes are formed through sidewalls of the tubular base, and wherein the first end of the tubular base is disposed proximate the opening of the wall of the plenum; and a plurality of connectors are disposed between the deflector and the second end of the tubular base.

11. The system according to any one of paragraphs 7 to 10, wherein the plenum is disposed in a fluid catalytic cracker.

12. The system of paragraph 11, wherein the fluid catalytic cracker comprises a riser, a separation unit, and a regenerator.

13. The system of paragraph 12, wherein the plenum and the separator are components of the separation unit.

14. A method for preventing coke formation in a plenum, comprising introducing a first vapor stream to a first plenum inlet of a plenum via a first separator outlet, wherein the first separator outlet joins a first separator to the first plenum inlet; and diverting the first vapor stream away from an outlet of the plenum to create turbulence within the plenum.

15. The method of paragraph 14, wherein diverting the first vapor stream further comprises disposing a turbulator proximate the first plenum inlet at least partially in a flow path of the first vapor stream, the turbulator comprising a deflector.

16. The method of paragraph 15, wherein the turbulator further comprises a tubular base having a first end and a second end, wherein one or more holes are formed through sidewalls of the tubular base, and wherein the first end of the tubular base is disposed proximate the first plenum inlet; and a plurality of connectors disposed between the deflector and the second end of the tubular base, wherein the turbulator diverts the first vapor stream at least partially between the tubular base and the deflector.

17. The method of paragraph 15 or 16, wherein diverting the first vapor stream with the turbulator reduces low velocity regions within the plenum, as compared to the same plenum without the turbulator.

18. The method according to any one of paragraphs 14 to 17, further comprising cracking at least a portion of an olefin-rich hydrocarbon in one or more risers in the presence of steam and one or more catalysts at conditions sufficient to produce the first vapor stream.

19. The method according to any one of paragraphs 14 to 18, introducing a second vapor stream to a second plenum inlet of the plenum via a second separator outlet, wherein the second separator outlet joins a second separator to the second plenum inlet, and wherein the second plenum inlet opposes the first plenum inlet such that the first and second vapor streams are directed toward one another.

20. The method according to any one of paragraphs 14 to 19, wherein the first plenum inlet directs the first vapor stream tangentially along an inner surface of the plenum.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An FCC unit, comprising:
a reactor;
a cyclone disposed inside the reactor;
a plenum disposed inside the reactor, wherein the cyclone is in fluid communication with the plenum;
a riser in fluid communication with the reactor;
a deflector disposed inside the plenum proximate an inlet to the plenum for receiving fluid from the cyclone; and
a tubular coupled to the cyclone and the plenum, the tubular having a first end and a second end, wherein one or more vents are formed through a sidewall of the tubular, and wherein the one or more vents are located within the plenum.

2. The FCC unit of claim 1, wherein the deflector is in the shape of a flat plate.

3. The FCC unit of claim 1, wherein the first end of the tubular is proximate the inlet to the plenum.

4. The FCC unit of claim 1, wherein the deflector is concave with respect to the inlet.

5. The FCC unit of claim 4, further comprising:
one or more connectors disposed between the deflector and the second end of the tubular.

6. The FCC unit of claim 5, wherein the first end of the tubular is fixed to a wall of the plenum, and wherein an opening at the first end corresponds in size and shape to the inlet in the plenum.

7. The FCC unit of claim 1, wherein each vent comprises two curved sides and two straight sides.

8. A system for fluid catalytic cracking, comprising:
a reactor;
a riser in fluid communication with the reactor, wherein the reactor comprises:

a plenum having an opening in a wall thereof;

a separator having an outlet pipe disposed thereon, wherein the outlet pipe is disposed at the opening in the wall of the plenum, wherein one or more holes are formed through a sidewall of the outlet pipe, and wherein the one or more holes are located within the plenum; and a turbulator disposed inside the plenum proximate the opening in the wall of the plenum, the turbulator comprising a deflector disposed adjacent a terminal end of the outlet pipe.

9. The system in claim 8, wherein the separator is a cyclone.

10. The system in claim 8, wherein the deflector is concave with respect to the inlet.

11. The system in claim 8, wherein the turbulator further comprises a plurality of connectors disposed between the deflector and the second end of the tubular base.

12. The system in claim 8, wherein the plenum comprises a plenum outlet and the deflector is disposed between the terminal end of the outlet pipe and the plenum outlet.

13. The system in claim 12, wherein the system comprises a regenerator in fluid communication with the separator.

14. The system in claim 13, wherein the regenerator is in fluid communication with the riser.

15. A method for preventing coke formation in a plenum, comprising:

cracking at least a portion of a hydrocarbon in one or more risers in the presence of steam and one or more catalysts at conditions sufficient to produce a first vapor stream;

introducing the first vapor stream to a first plenum inlet of a plenum via a first separator outlet, wherein the first separator outlet joins a first separator to the first plenum inlet; and diverting the first vapor stream away from an outlet of the plenum to create turbulence within the plenum, wherein diverting the first vapor stream further comprises disposing a turbulator proximate the first plenum inlet at least partially in a flow path of the first vapor stream he turbulator comprising a deflector, wherein the turbulator comprises a tubular base having a first end and a second end, wherein one more holes are formed through sidewalls of the tubular base and wherein the one or more holes are located within the plenum.

16. The method in claim 15, wherein the first end of the tubular base is disposed proximate the first plenum inlet and wherein the turbulator further comprises:

a plurality of connectors disposed between the deflector and the second end of the tubular base, wherein the turbulator diverts the first vapor stream at least partially between the tubular base and the deflector.

17. The method in claim 15, wherein diverting the first vapor stream with the turbulator reduces low velocity regions within the plenum, as compared to the same plenum without the turbulator.

18. The method in claim 15, wherein the hydrocarbon comprises one or more olefins.

19. The method in claim 15, introducing a second vapor stream to a second plenum inlet of the plenum via a second separator outlet, wherein the second separator outlet joins a second separator to the second plenum inlet, and wherein the second plenum inlet opposes the first plenum inlet such that the first and second vapor streams are directed toward one another.

20. The method in claim 15, wherein the first plenum inlet directs the first vapor stream tangentially along an inner surface of the plenum.

* * * * *